APPARATUS FOR READING MAGNETIC TAPE

Filed July 31, 1968 3 Sheets-Sheet 1

| | P1 | | | | | | | | | | G | | P2 | |
|---|---|---|---|---|---|---|---|---|---|---|---|---|---|---|
| | W1 | 2 | 3 | 4 | 5 | W1' | 2' | 3' | 4' | 5' | | | W1 | 2 |
| T1 | 1 | 1 | 0 | 1 | 1 | 1 | 1 | 0 | 1 | 1 | 0 | 0 | 0 | 0 |
| 2 | 1 | 0 | 1 | 0 | 1 | 1 | 0 | 1 | 0 | 1 | 0 | 0 | 0 | 0 |
| 3 | 0 | 1 | 1 | 0 | 0 | 0 | 1 | 1 | 0 | 0 | 0 | 0 | 1 | 1 |
| 4 | 1 | 0 | 0 | 0 | 0 | 1 | 0 | 1 | 0 | 0 | 0 | 0 | 0 | 1 |
| 5 | 1 | 0 | 0 | 1 | 0 | 1 | 0 | 0 | 1 | 0 | 1 | 1 | 0 | 0 |
| 6 | 0 | 0 | 0 | 0 | 1 | 0 | 0 | 0 | 0 | 1 | 0 | 0 | 0 | 0 |
| 7 | 1 | 1 | 0 | 1 | 0 | 1 | 1 | 0 | 1 | 0 | 0 | 0 | 0 | 1 |
| | B1 | | | | | B2 | | | | | | | | |

APPARATUS FOR READING MAGNETIC TAPE

Filed July 31, 1968 3 Sheets-Sheet 2

United States Patent Office 3,531,769

Patented Sept. 29, 1970

3,531,769

APPARATUS FOR READING MAGNETIC TAPE

John Young Condie Montgomery, Arthur Owen Stanesby, and Donald Ferguson Walker, Edinburgh, Scotland, assignors to Ferranti, Limited, Hollinwood, England, a company of Great Britain and Northern Ireland Filed July 31, 1968, Ser. No. 749,081
Claims priority, application Great Britain, Aug. 8, 1967, 36,260/67
Int. Cl. G06k 5/00
U.S. Cl. 340—146.1 2 Claims

ABSTRACT OF THE DISCLOSURE

Apparatus for reading magnetic tape whilst the tape is in motion, where the tape is of the kind in which each item of data is recorded with a parity-check digit as a digital word across the tape and the words are grouped in pairs of successive first and second blocks of the same number of supposedly identical words. The apparatus includes a parity-check stage so cooperating with a write-control unit as to pass to a store each word as read from each first block if the word is parity-correct, but replace any parity-faulted word of a first block by the corresponding word of the associated second block if parity correct. The apparatus also including a sequence-check stage so cooperating with the write-control unit to sequence-fault any first block if without the correct number of words and replace it by the associated second block if parity and sequence correct.

This invention relates to apparatus for reading magnetic tape which carries data in the form of "words" of binary-digit bits, each word being disposed across the tape and including a bit for parity checking.

Conventional forms of such apparatus which requires the tape drive to be arrested to read each word are inconveniently limited as regards both the reading rate and the data packing density, i.e. the number of words per inch of tape length.

An object of the invention is to provide such apparatus for use where the data is recorded as pairs of blocks of words, the second block of each pair being intended to be a repeat of the first block, for checking purposes, and one bit position in each word identifying the end of each block, the apparatus being such that the reading speed and packing density area to some extent superior to such apparatus as hitherto known.

In accordance with the present invention, there is provided apparatus for reading magnetic tape which carries data in the form of pairs of blocks of binary-digit words of which the first block of each pair consists of N words each of $n$ bits and the second block is intended to be a repeat of the first block, each word being disposed across the tape and including significant data bits and a parity-check bit, with one bit position identifying the end of each block, the apparatus including a digital store, reading means to respond to each word on the tape by reading all its $n$ bit positions substantially simultaneously, channels for passing to the store the said significant bits as read, a parity fault detector stage connected to the reading means for checking each word as read and deriving a parity fault signal if such a fault is present, block-response and block-identifying stages connected to the reading means to derive respectively from said one bit position a signal representing the end of each block and signals distinguishing one block from the other of each pair, a sequence-fault detector stage responsive to the signals from the block-responsive stage for checking at the end of each block that N words have been processed during the reading of that block, and deriving a sequence fault signal if they have not, a logic network connected to receive said fault signals and the block distinguishing signals and in dependence on them control the admission to the store of the significant bits of the data so that (i) where the first block of a pair is free from parity and sequence faults, the network causes the significant bits of the N words of the first block to be written into the store, and ignores the second block, (ii) where the first block of a pair includes one or more parity faulted words, the network causes the significant bits of the corresponding word or words, if parity correct, of the second block to be written into the store instead, unless the second block has a sequence fault, (iii) where the first block of a pair has a sequence fault, the network causes the significant bits of all the words, if parity correct, of the second block to be written into the store instead, unless the second block has a sequence fault, (iv) where under conditions (ii) and (iii) a fault in the first block is not corrected by the second block, the network initiates fault response action.

By the "significant" bits of a word is meant the bits which represent the data itself, to be passed to the store, as opposed to the bits which are included in the word for checking or control purposes.

In the accompanying drawings.

The invention will now be described by way of example as used for reading magnetic tape which carries binary-digit data in the manner described above.

Figures 1, 3:
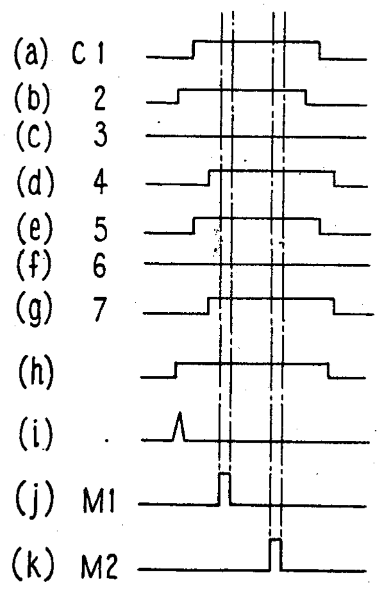
FIG. 1 is a diagram showing the form of the data as recorded.
FIG. 3 is a set of waveforms to illustrate the operation of part of the apparatus of FIG. 2.

As shown in FIG. 1, the tape 11 has seven tracks of which the five tracks T1 to T5 carry the significant bits of each seven-bit word—that is, the data itself. In this case the data is in the form of any number of 0 to $\pm 15$ expressed in digital form in tracks T1 and T4, with track T5 indicating the sign. This it does by holding digit 0 for a positive number and digit 1 for a negative. As track T5 does not need both its signals where tracks T1 to T4 all hold digit 0, there is one combination of the five tracks that is spare. This is arranged to be the one representing "minus zero"—i.e. each of tracks T1 to T4 holding digit 0 and track T5 holding digit 1. A use for this spare combination will be indicated shortly.

The remaining tracks T6 and T7 of each word are for control and checking purposes.

The data is recorded in pairs P1, P2, etc., each of first and second five-word blocks B1 and B2. Each block B1 of five words W1 to W5, disposed across the tape, is immediately followed by a second block B2 which is intended to be an exact repeat of block B1. As however the repeat may not be exact, through one or more faults of some kind, the words of block B2 are indicated in the drawing as $W1^1$ to $W5^1$.

Successive pairs of blocks are separated by two-word gaps G.

Of the seven tracks, T1 to T5 carry the significant data, as already mentioned.

Gaps G are identified by means of the spare combination mentioned above, together with a digit 0 in each of tracks T6 and T7—that is, by digit 1 in track T5 and digit 0 in each of the other six.

Track T6 identifies the end of each block by containing a unity digit in each of words W5 and $W5^1$.

Track T7 carries a parity bit in the form of a unity digit where the total if unity digits in tracks T1 to T6 of the word is an even number of zero.

A typical message is shown in the drawing, using the figures "0" and "1" to indicate the states of magnetisation which represent them. For the sake of illustration a parity fault is assumed in word W3 of pair P1 but not in its second appearance at W3[1]. Otherwise the words in the respective blocks are the same—that is, W1[1] is the same as W1, and so on.

The recording system is assumed to be such that a change of flux polarity represents digit 1 and no change in polarity represents digit 0. The unity digits along each track are therefore represented by magnetism of alternate polarity, with zero digits unrecorded. Thus (for example), looking at track T6 of FIG. 1, its unity digits in words W5 and W5[1] will be represented by magnetism of opposite polarity. The signal in this track may thus be used to indicate not only the end of each block, by a mere change of polarity, but also to distinguish one block from the other of each pair, in dependence on the direction of the polarity change.

With this system of recording it is necessary for the parity check to be as above indicated—that is, a parity bit 1 when the digit total in the other six tracks is an even number—since this ensures that every word contains digit 1 in at least one track, if only in track T7, and so provides by a flux reversal an indication that a digit position is passing the reading head.

Figure 2:
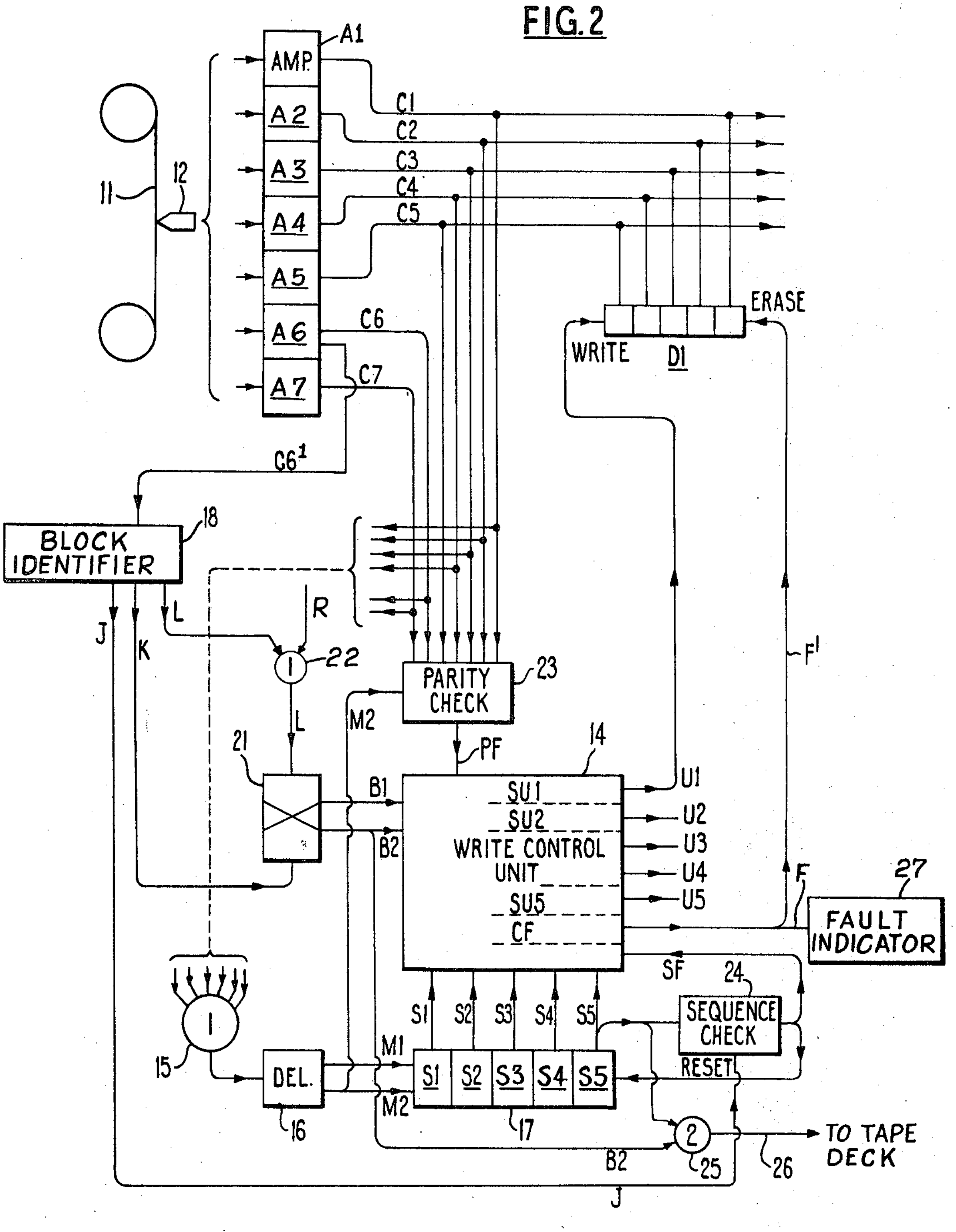
FIG. 2 is a schematic diagram, largely in block form, of one embodiment of the invention.

Suitable apparatus for reading magnetic tape which carries data in this form will now be described with reference to FIG. 2. Except where otherwise stated, the apparatus is of the kind which is operated by positive signals, negative and zero signals being ineffective.

The tape 11 is read by reading means in the form of a suitable seven-way head 12 which provides a parallel readout from tracks T1 to T7 into channels C1 to C7, by way of amplifiers A1 to A7. The channels C1 to C5, which carry the significant bits, lead in parallel to the separate divisions D1 to D5 of a digital store. Division D1 of the store is reserved for words W1, or W1[1] where a word W1 is faulty. Division D2 is for words W2 and W2[1]; and so on. Only division D1 is shown in the drawing.

The actual writing of the significant bits into the store is controlled by a logic network in the form of a write control unit 14 which itself is controlled as follows by the signals derived from the tape.

All the channels except C5 are connected by way of a six-entry OR gate 15 and delay stage 16 to stepping means in the form of a counter 17 by way of leads M1 and M2 carrying pulses at different delayed times. The counter has five stages S1 to S5 the outputs from which are connected to unit 14 by way of leads which are also designated S1 to S5.

As will be described in more detail later, with reference to FIG. 4, unit 14 includes five sub units SU1 to SU5, one for each of the five words of a block, which are brought into action one at a time by counter 17 whilst it is stepped from stage to stage as the respective words are brought to the reading head. Thus stage 1 actuates sub unit SU1 in response to words W1 and W1[1], stage 2 actuates SU2 in response to W2 and W2[1], and so on.

From amplifier A6 is derived over channel C6[1] a further output which retains the sense information of the recorded pulses. Channel C6[1] is connected to a combined block-responsive and block-identifying stage 18 which derives over a lead J a positive block-responsive signal at the end of each block—that is, in coincidence with the last digit of the block. The stage also derives over a lead K a positive signal to identify the end of each block B1 only; and over a lead L a positive signal to identify the end of each block B2 only. Each lead is otherwise negative. This separation is effected in a simple manner in reliance on the above-mentioned difference of polarity of the recorded digits in this track at the ends of the respective blocks.

Leak K is connected to one switching input of a bistable stage 21 which supplies signals to identify the respective blocks of a pair. The other switching input is derived from a two-entry OR gate 22. To one of the inputs of this gate is connected lead L; to the other is applied over a lead R a master reset signal from exterior equipment which is not shown.

Outputs from stage 21 are applied to unit 14 over leads B1 and B2 representing the respective blocks and positively energised singly when the stage is in one or other of its stable states.

Lead M2 is additionally connected to apply a timing control signal to a parity fault detector stage 23, to which all seven channels C1 to C7 are applied as inputs. The input from the stage is applied over a parity fault lead PF to unit 14.

Lead S5 of the counter is additionally connected to one of the two inputs of a sequence fault detector stage 24 the other input of which is supplied by lead J from stage 18. The stage is designed to respond to the block-responsive signals on lead J so as to check at the end of each block that five words have been processed during the reading of the block. As already stated, the end of each block is indicated by a positive signal on lead J, and the number of words processed is indicated by the number then held in counter 17. Stage 24 is accordingly actuated by the signal on lead J to derive a sequence fault signal unless stage S5 is also actuated. The output is applied over a sequence fault lead SF to unit 14 and to reset point on the counter 17. The sequence fault detector is also operated when stage 5 is actuated but track T6 does not hold digit 1 and in consequence lead J is negative.

Lead S5 is also connected as one of the inputs to a two-entry AND gate 25 having lead B2 (from stage 21) as the other input. The output is applied over a lead 26 to the tape deck to switch off the drive motor in the circumstances to be described.

From sub units SU1 to SU5 of unit 14, control signals are applied over output lead U1 to U5 to the respective divisions of the store. From fault equipment CF of unit 14 common to all sub units, an output lead F is connected to some sort of fault indicator 27.

The operation will be briefly described, starting with the tape arrested with one of the gaps G at the reading head. In this quiescent condition, stage 21 is in that one of its stable states which energises lead B1, to represent block B1, and the counter 17 holds digit 5 with stage S5 energising lead S5 positively.

For brevity, and where confusion is not likely to be caused, the term "word" will be used to designate both the significant group of five bits, as intended for the store, and the whole group of seven bits as derived from the tape.

On receipt of a command signal requiring block pair P1 to be read, the tape drive begins, and continues steadily and smoothly without halting at a word until all ten words from W1 to W5[1] of the pair have passed the reading head.

Whilst each word is passing the head, its bit positions are read in parallel—that is, substantially simultaneously. It is assumed that the tape recording system is such that a unity digit results in the energisation of the associated one of channels C1 to C7 by a steady positive signal, which lasts as long as the word is under the head, and zero digit by the absence of a signal. The effect of reading word W1 of FIG. 1 is shown in FIG. 3. Thus the channels energised are C1, C2, C4, C5, and C7—see waveforms (*a*), (*b*), (*d*), (*e*) and (*g*). Channels C3 and C6 are not energised—waveforms (*c*) and (*f*). As shown in the drawing there is some lack of registration between these positive pulses, due to a usually unavoidable degree of skew between the direction of each word across the tape and the direction of the line of reading heads. Thus the reading of the bits has not been exactly simultaneous. Though the significant part of the word as represented by waveforms (*a*) to (*e*) is present at the inputs to all the store divisions D1 to D5, it cannot enter any of them in the absence of an instruction over one of the output leads U1 to U5 of unit 14.

Though waveform (*e*) is included in FIG. 3, the corresponding signal, from channel C5, is not among those applied to the gate 15, as already mentioned.

With several of its inputs thus energised, the output from gate 15 is as shown at waveform (*h*). From the leading edge of that signal, stage 16 derives a spike by differentiation—waveform (*i*)—and, after delays, pulses M1 and M2, in that order— waveforms (*j*) and (*k*)—within each of the pulses in the channels. These pulses M1 and M2 are applied to the counter over the leads so labelled.

In response to the trailing edge of pulses M1, the counter is switched from stage S5 to S1, but does not energise lead S1 positively until the ensuing pulse M2 has opened a gate of duration equal to the width of that pulse in the output of the stage. At the same time pulse M2 samples the state of the parity checking stage 23. Thus the signal from stage 23, representing whether or not word W1 is parity correct, is applied to sub unit SU1 at the same time as the signal from state S1, whilst the output from stage 21 over lead B1 is applying a signal representing the first block.

If the word is parity correct, sub unit SU1 energises its output lead U1 to allow the word to be written in parallel form from channels C1 to C5 into store division D1, and the sub unit is left in a condition appropriate to ignoring the corresponding word $W1^1$ of the next block.

If on the other hand stage 23 has detected a parity fault, the word is not passed into the store, and the sub unit is left in a condition appropriate to passing into the store the word $W1^1$ instead, if it is parity correct, or providing at indicator 27 a fault response action if it is not.

With the arrival of the next word W2 at the reading head, channels C1, C3, and C7 become positively energised and gate 15 passes a signal which causes stage 16 to supply another signal M1, to step the counter to stage S2. This allows the word to be parity tested and sub unit SU2 to be conditioned accordingly.

At the end of block B1, the sequence fault detector 24 tests for sequence correctness by checking whether the counter holds digit 5 at the time when the detector is positively energised over lead J, as already mentioned. It will be assumed for the moment that the sequence is correct and that accordingly no fault output signal is supplied over lead SF.

At the end of block B1, the positive signal thereby set up in lead K switches stage 21 so as to represent block B2 by energising the output lead so labelled.

With the arrival of block B2, the process is repeated; but in only those sub units which had received a parity fault signal during block B1 is there any effective reaction. In each of these sub units, if the word is now parity correct, it is passed into the store; but if that same word is again at fault, the common fault unit CF causes stage 27 to be energised to provide some sort of fault response.

The effect of a sequence fault at the end of block B1 is to pass to unit 14 over lead SF a signal to switch to its fault condition each sub unit where the word in block B1 was parity correct. This leaves each sub unit in its fault condition and therefore ready to respond to the corresponding words of block B2. If each word is correct, it is allowed to pass into the store, where it rewrites any word that may have been written into the same address during block B1. Any parity fault in block B2 will elicit a fault response, even if the corresponding word in block B1 had been parity correct and written into the store, for the sequence fault at the end of block B1 is a sign that some word in that block must be in error.

A sequence fault at the end of block B2 has no effect if each word of block B1 has been parity correct and there had been no sequence fault at the end of it. If however there has been a parity or a sequence fault in block B1, a sequence fault at the end of block B2 will elicit a fault response.

At the end of the second block, the coincidence of positive signals on leads B2 and S5 at gate 25 causes a signal to be applied to the tape deck to arrest the drive. At the same time the arrival of the gap G at the end of the second block removes all positive inputs to gate 15 and so arrests the stepping of the counter. It will be appreciated that the counter would not normally be arrested when the significant part of any of words W1 to W4 or their counterparts in block B2 was zero, for then the parity number in track T7 should be digit 1, thus providing a signal from channel C7 to step the counter by way of stages 15 and 16.

At the end of block B2, a signal over lead L restores stage 21 to represent block B1. The apparatus is then in its quiescent state ready to read the next block pair as soon as the drive is resumed. The master reset signal applied by way of lead R and gate 22 acts to switch stage 21 to its block B1 state if for some reason the signal on lead L fails to do this.

Thus the operation of the apparatus may be summarised as follows:

(1) If block B1 is free from both parity and sequence faults, the five words of the block are written into the store and block B2 is ignored.

(2) If block B1 includes one or more parity faults, the corresponding word or words of block B2, if parity correct, are written into the store instead.

(3) If block B1 ends with a sequence fault, each of the words stored during it is replaced by the corresponding word in block B2, if parity correct.

(4) (a) If both blocks have a sequence fault, or (b) both of corresponding words have parity faults, or (c) either block has a parity fault and the other a sequence fault, a fault response is initiated.

Each such response includes the delivery of a signal from lead F over a lead $F^1$ to the divisions of the store to clear the last five entries—that is, all the words that were written into the store during the preceding block pairs.

Figures 4, 5:
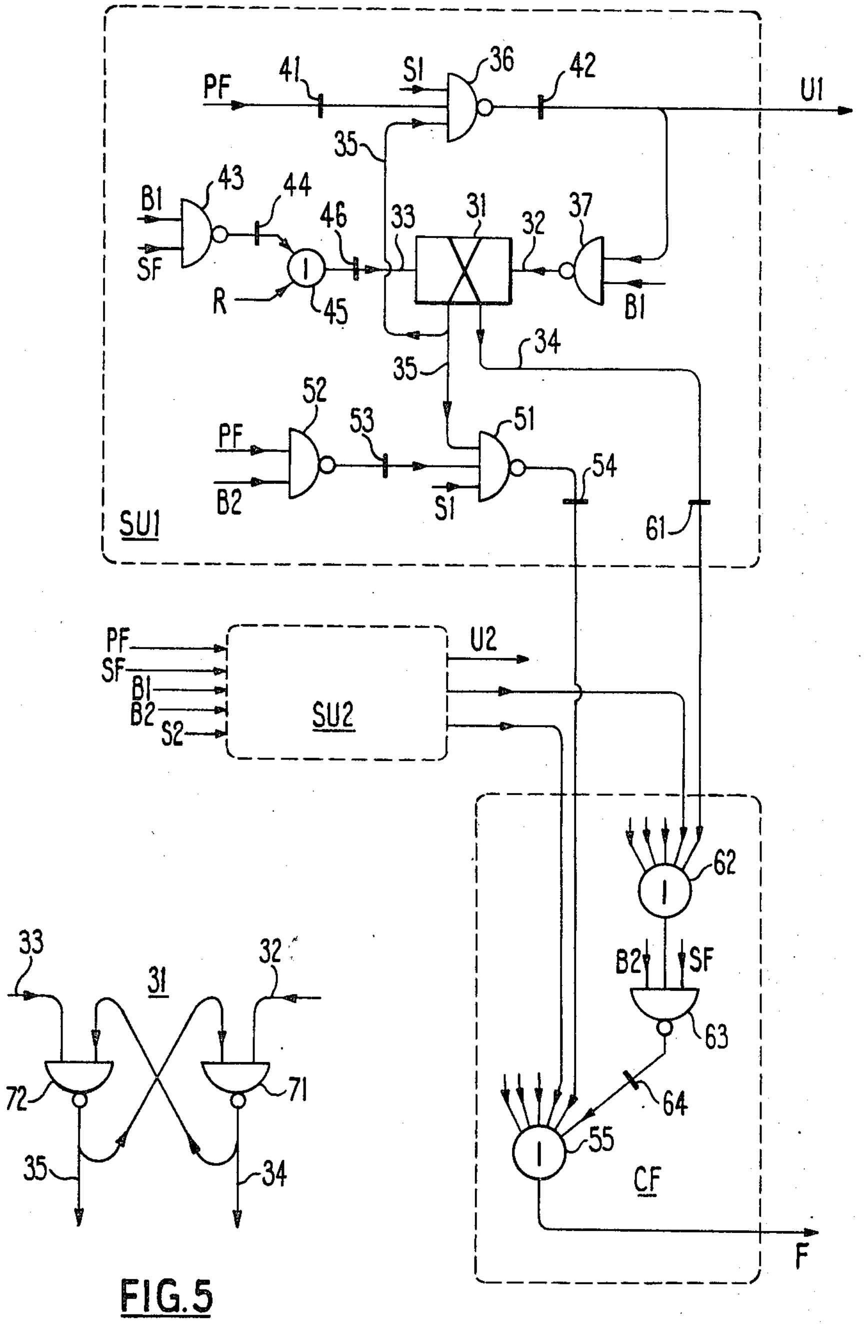
FIG. 4 shows in more detail a part of the apparatus shown generally in FIG. 2.
FIG. 5 shows in detail a part of the apparatus shown in FIG. 4.

The logic network of the write control unit 14 may take the form shown in FIG. 4, in which the components already described are given their previous references.

The circuit relies in the main on positive NAND logic, and the terms used respecting it should be understood to have the following meanings in the present context.

A NAND gate produces a negative output only when each input is positive; when any input is negative, the output is positive. Such a gate will be referred to as "closed" unless all its inputs are positive; it will then be "open."

A negater (or NOT gate) reverses the polarity of the single input to it.

(Hence a NAND gate followed by a negater is the equivalent of a positive AND gate.)

A signal will be said to alert a gate if the signal has the polarity appropriate to opening the gate if the remaining input or inputs also possess that polarity.

For brevity, a positive-going signal or the lead which carries it will sometimes be referred to as merely as a positive signal or positive lead, as the case may be. Similarly with negative-going signals.

In FIG. 4, only sub unit SU1 and the common fault equipment CF of network 14 are shown in any detail. Sub unit SU2 is shown in outline to indicate how its fault output connections combine with those of sub unit SU1. The remaining sub units are omitted.

The principal feature of sub unit SU1 is a fault-control bistable stage 31 which not only represents by its state the result of checking the associated word W1 for a parity fault, or block 1 as a whole for a sequence fault, but also serves to allow a fault response to be provided when the conditions require it.

The two stable states of stage 31 will be referred to as the Set and Reset states; it is switched from Reset to Set by a negative signal on an input lead 32, and from Set to Reset by a negative signal on an input lead 33. In no other way can it be switched. Counterphase outputs are provided over leads 34 and 35, these signals being respectively of negative and positive senses when the stage is in its Reset state and of reverse sense when it is at Set.

Stage 31 is switched from Reset to Set over lead 32 by way of NAND gates 36 and 37. Gate 36, the parity gating means, has three inputs: lead S1, a connection from parity check stage 23 over lead PF by way of a negater 41, and a connection from lead 35 of stage 31. The output from the gate is applied by way of another negater 42 to lead U1 and so to the store, and forms one of the two inputs to the fault-control setting means represented by gate 37. The other input to gate 37 is derived from lead B1 of block-identifying stage 21, and the output is applied over lead 32 to stage 31.

Stage 31 is switched from Set to Reset by way of resetting means in the form of a NAND gate 43 the two inputs to which are derived from leads SF (from sequence fault detector 24) and B1. The output is applied by way of a negater 44, a two-entry OR gate 45, and another negater 46 to lead 33. The other input to gate 45 is over a lead R from the master resetting source above mentioned.

Output lead 35 is additionally connected as one of the three inputs to individual fault-gating means in the form of a NAND gate 51. Leads PF and B2 are connected by way of a NAND gate 52 and negater 53 to provide a second input to gate 51, whilst lead S1 provides a third. The output from gate 51 is applied by way of a negater 54 and a six-entry OR gate 55 to the fault response lead F.

Output lead 34 is connected by way of a negater 61 and a five-entry OR gate 62 as one of the three inputs to common fault-gating means in the form of a NAND gate 63. The other two inputs are provided by leads SF and B2 and the output is applied by way of a negater 64 as one of the inputs to gate 55.

It is to be noted that of the two fault-gating means above referred to, gate 51 is individual to sub unit U1, whereas gate 63 is common to the whole network. Gate 63 thus forms part of the common fault unit CF, along with OR gates 55 and 62.

The equipment for sub unit S2 is not shown in detail. As with sub unit SU1, control inputs are provided over leads PF, SF, B1 and B2; but the actuating signal is now supplied over lead S2 rather than S1. Outputs are provided to gates 55 and 62 of unit CF as before; but over lead U2, rather than U1, to division D2 of the store.

Similar arrangements are made for sub units SU3 to SU5.

In the quiescent condition of the apparatus, such as when the tape is arrested with one of the gaps G at the reading head, the condition of the various components depicted in FIG. 4 is as follows.

Input leads PF, SF, S1 to S4, and B2, and output leads U1 and F, all negative. Inputs leads B1 and S5 are positive. Leads J, K, and L are all negative. Fault control stage 31 is in its Reset state, holding lead 34 negative and lead 35 positive.

All the NAND gates of the sub unit are closed because of negative signals on at least one input lead of each, these inputs being: lead S1 for gates 36 and 51; the lead from negater 42 for gate 37 (the output from gate 36 being reversed by that negater); lead SF for gate 43; and lead PF for gate 52.

As regards gates 55, 62, and 63 of the common fault unit, the input to OR gate 62 from stage 31, as reversed by negater 61, is positive. The output from gate 62 as applied to gate 63 is therefore positive; but gate 63 is held closed by the negative signals on leads B2 and SF. The resulting positive output from gate 64 is reversed by negater 64 to apply a negative input to gate 55. Another negative input to gate 55 is derived from the closed gate 51, after reversal by negater 54. As all the remaining inputs from sub units SU2 to SU5 are negative, the output from the gate over lead F is negative also and so providing no fault response.

The operation of the logic network will now be described taking the above-summarised conditions (1) to (4) in turn.

(1) Block B1 free from parity and sequence faults

As block B1 begins to be read, the signal from word W1 actuates gate 15 and delay stage 16 (see FIG. 2) to generate pulses M1 and M2. Pulse M1 switches the counter from stage S5 to stage S1, so that on the arrival of pulse M2 stage S1 actuates sub unit SU1 by making lead S1 positive for the duration of that pulse. As the word is parity correct, lead PF remains negative; hence the output from negater 41 (constituting one input to gate 36) is positive. The input to the gate from stage 31 over lead 35 is also positive, as stage 31 is in its Reset state. Thus the arrival of a positive signal over lead S1 causes gate 36 to open, its output becoming negative. Hence the output from negater 42 becomes positive, and so transmits over lead U1 a signal to allow the word W1 to pass into division D1 of the store.

Gate 37, already alerted by the positive condition of lead B1, is opened by the signal from negater 42 and so applies a negative signal over lead 32 to switch stage 31 to its Set state.

The resulting change to positive of lead 34, after reversal to negative by negater 61, removes one of the alerting inputs to gate 62, whilst the change to negative of lead 35 removes an alerting signal from gate 51. A fault response in respect of sub unit SU1 is thereby inhibited.

Stage 31 remains thus representing by its Set state the parity-correct condition of word W1 for at least the rest of block B1.

Sub units SU2 to SU5 are actuated in a similar manner in approximate synchronism with the reading of the corresponding words W2 to W5. As all are assumed to be parity correct, their fault-control stages (corresponding to stage 31 of sub unit SU1) becomes switched to their Set states. Thus all five of those stages are at Set by the end of the block.

As there is assumed to be no sequence fault, lead SF remains negative and so maintains gate 43 closed.

With the arrival of block B2, stage 21 becomes switched by the signal on lead K to energise lead B2 instead of B1. As lead 35 in sub unit SU1 is negative, as the result of stage 31 being in its Set state, gate 36 is closed and so prevents the passage of word $W1^1$ to the store; the word is thus "ignored." Similarly in the other sub units. Thus if any of the word $W^1$ to $W5^1$ has a parity fault, no harm is done: the corresponding parity-correct word of block B1 is left undisturbed in the store.

Similarly a sequence fault at the end of block B2 has no effect, for though such a fault would cause gate 63 to be alerted by the signals over leads B2 and SF, the lead from gate 62 would be negative because all five of its inputs would be held negative by the Set condition of the respective fault-control stages.

(2) Parity fault in block B1 only

If a word—W1, say—in block B1 has a parity fault, the resulting positive potential on lead PF, reversed to negative by negater 41, keeps gate 36 closed. This has two effects: (a) the word is not passed into the store, and (b) stage 31 is left at Reset, thereby remaining alerting gate 36 and the two fault gates 51 and 63. Consequently if the corresponding word $W1^1$ in block B2 is parity correct, gate 36 allows its passage into the store. Nevertheless stage 31 continues to remain at Reset (since gate 37 is closed by the now negative potential on lead B1) and so continues to alert the fault gates in case there is a sequence fault at the end of block B2. The effect of such a fault is mentioned when considering condition (4) below.

(3) Sequence fault at end of block B1

Such a fault is not required to give an alarm response, since block B2 may be faultless. The result of a sequence fault in block B1 is to switch to their Reset states all the fault-control stages that were set during that block. This is effected in sub unit SU1 by the combination of positive signals on leads SF and B1 opening gate 43 and so applying a negative signal over lead 33 to stage 31. Similarly in the other sub units. Any words that were written into the store during block B1 are re-written in the same addresses by the corresponding words of block B2 if parity correct, since the Reset state of each fault-control stage 31 allows gate 36 (or the corresponding gate of another sub unit) to pass a signal to admit such a word to the store.

(4) Faults resulting in a fault response (a) If both blocks have a sequence fault, the alerting of gate 63 by the fault-control stages, as reset by the sequence fault signal at the end of block B1, allows the sequence fault at the end of block B2 to open gate 63. The resulting negative signal from gate 63, reversed by negater 64, passes as a positive fault response signal through gate 65 to lead F.

(b) If both of corresponding words, e.g. W1 and W1[1], have a parity fault, gate 51 comes into action. Already alerted by the signal on lead 35 from stage 31 at Reset as the result of the fault in word W1, and by the signal on lead S1, gate 51 is opened during word W1[1] by the signal from gate 52, which itself is opened by the positive signals over leads PF and B2. The resulting negative signal from gate 51, reversed to positive by negater 54, passes gate 55 to actuate the fault response over lead F.

(c) As the result of a parity or sequence fault in block B1 is to leave at least one fault-control stage in a state alerting both fault gates (51 and 63, in sub unit SU1), a sequence fault at the end of block B2 will cause a fault response as at (a) above; whereas a second parity fault in the same word will cause a fault response as in (b).

The fault-control bistable stage 31 may conveniently be in the NAND gate form shown in FIG. 5. Switching lead 32 is connected as one of the inputs to a two-entry NAND gate 71, and switching lead 33 as one of the inputs to a similar NAND gate 72. The output from gate 71 is applied to lead 34 and as the second input to gate 72. Similarly the output from gate 72 is applied to lead 35 and as the second input to gate 71.

The stage is in its Reset state when gate 71 is maintained open by positive potentials at each input, the resulting negative output being applied to lead 34 and holding gate 72 closed, with lead 35 positive. Lead 31 is always positive, except for a sequence fault at the end of block B1 or a master reset. Hence when lead 32 goes negative and closes gate 71, the resulting positive output from that gate combines with the positive signal on lead 34 to open gate 72. The stage is then in its Set state. The stage is similarly switched from Set to Reset by a negative signal on lead 33.

As above mentioned, the drive is arrested at the end of block B2. When the next block pair is to be read, a positive master reset signal is sent out over lead R by a manual operation or by equipment extraneous to that of the invention. The effect of this signal after passing gate 45 and being reversed by negater 46 is to switch to its Reset state each of the fault control stages—stage 31 in sub unit SU1—that was in its Set state at the end of block B2. With stage 21 (FIG. 2) restored to represent block B1 as described with reference to FIG. 2, the logic network is in its quiescent condition as described with reference to FIG. 4. The drive is then resumed.

The apparatus of the invention is not restricted to use with magnetic tape having only seven tracks; it may for example be used to read tape of the well known nine-track kind; in which case the additional two tracks may be used for conveying any desired auxiliary data.

Nor is the invention restricted to reading blocks of five words each of seven digit bits—in other words, the values of the above-mentioned numbers N and $n$ need not be those of the particular embodiment of the invention described above.

What we claim is:

1. Apparatus for reading magnetic tape which carries data in the form of pairs of blocks of binary-digit words of which the first block of each pair consists of N words each of $n$ bits and the second block is intended to be a repeat of the first block, each word being disposed across the tape and including significant data bits and a parity-check bit, with one bit position for identifying the end of each block, the apparatus including (a) a digital store, (b) reading means to respond to each word on the tape by reading all its $n$ bit positions substantially simultaneously, (c) channels for passing to the store the said significant bits as read, (d) a parity fault detector stage connected to the reading means for checking each word as read and deriving a parity fault signal if such a fault is present, (e) block-response and block-identifying stages connected to the reading means to derive respectively from said one bit position a signal representing the end of each block and signals distinguishing one block from the other of each pair, (f) a sequence-fault detector stage responsive to the signals from the block-responsive stage for checking at the end of each block that N words have been processed during the reading of that block, and deriving a sequence fault signal if they have not, and (g) a logic network connected to receive said fault signals and the block distinguishing signals and in dependence on them control the admission to the store of the significant bits of the data so that (i) where the first block of a pair is free from parity and sequence faults, the network causes the significant bits of the N words of the first block to be written into the store, and ignores the second block, (ii) where the first block of a pair includes one or more parity faulted words, the network causes the significant bits of the corresponding words, if parity correct, of the second block to be written into the store instead, unless the second block has a sequence fault, (iii) where the first block of a pair has a sequence fault, the network causes the significant bits of all the words, if parity correct, of the second block to be written into the store instead, unless the second block has a sequence fault, (iv) where under conditions (ii) and (iii) a fault in the first block is not corrected by the second block, the network initiates fault response action.

2. Apparatus as claimed in claim 1 wherein the logic network includes (g1) for each of the N words a sub unit, (g2) stepping means for actuating the sub units in turn as the associated words are read, each sub unit including (g3) a fault-control bistable stage having Set and Reset stable states, (g4) parity gating means arranged to be open only when the sub unit is actuated with the fault-control stage in its Reset state and the associated word parity correct, and when so open allows the significant bits of that word to be passed into an address in the store, re-writing the word (if any) already in that address, (g5) setting means for switching the fault-control stage to its Set state when the parity gating means is open during the first block, (g6) resetting means for switching the fault-control stage to its Reset state when a sequence fault occurs at the end of a first block, (g7) and fault-gating means individual to that unit, the network further including (g8) fault-gating means common to all the sub units, (g9) connections from each fault-control stage to the associated individual fault-gating means and to the common fault-gating means to alert them both when the stage is in its Reset state, (g10) connections for applying the parity fault signals to each individual fault gating means to initiate a said fault response action if during a second block a parity fault should be detected when the associated individual fault gating means is alerted as aforesaid, (g11) connections for applying the sequence fault signals to the common fault gating means to initiate a said fault response action at the end of a second block if a sequence fault should be detected when the common fault gating means is alerted as aforesaid, and (g12) connections for resetting such of said fault-control stages as may be in their Set state at the end of each second block.

References Cited

UNITED STATES PATENTS

| | | | |
|---|---|---|---|
| 3,218,608 | 11/1965 | Barbeau | 340—146.1 |
| 3,238,501 | 3/1966 | Mak et al. | 340—146.1 X |
| 3,449,718 | 6/1969 | Woo | 340—174.1 X |

MALCOLM A. MORRISON, Primary Examiner

C. E. ATKINSON, Assistant Examiner

U.S. Cl. X.R.

340—174.1